July 2, 1929.  J. N. SHAW  1,719,627
COFFEE URN
Filed July 26, 1923
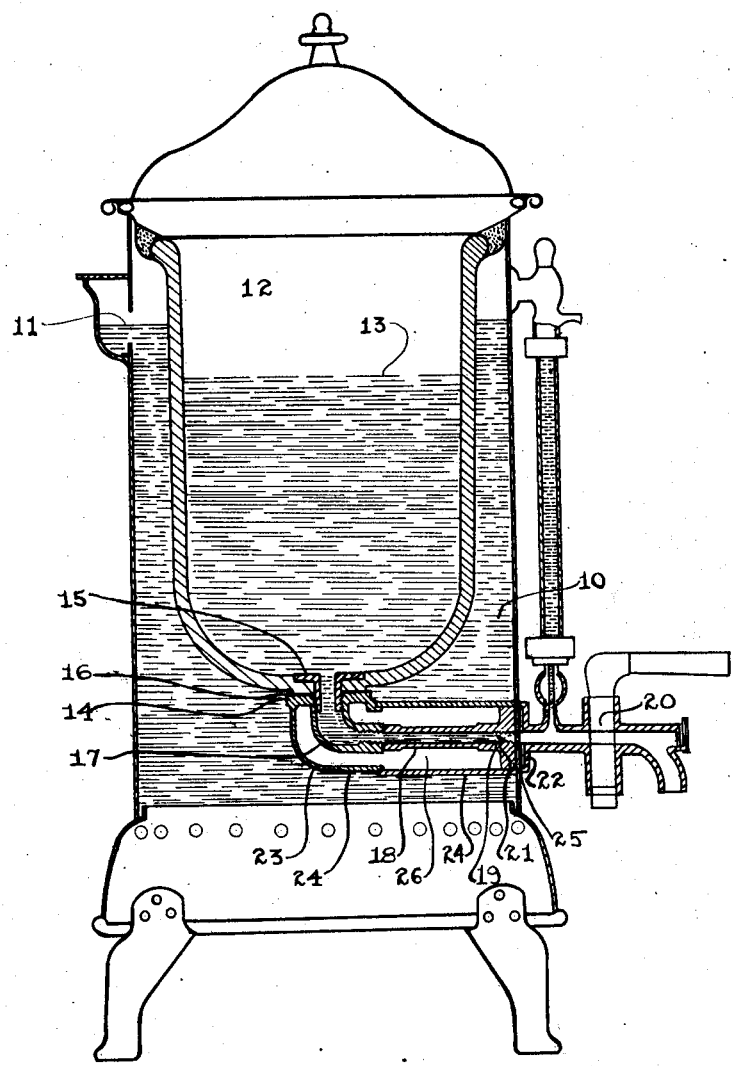
INVENTOR.
JOHN N. SHAW
BY Brayton Richards
ATTORNEY.

Patented July 2, 1929.

1,719,627

UNITED STATES PATENT OFFICE.

JOHN N. SHAW, OF SEATTLE, WASHINGTON, ASSIGNOR TO COMMERCIAL IMPORTING CO., INC., OF SEATTLE, WASHINGTON.

COFFEE URN.

Application filed July 26, 1928. Serial No. 295,382.

The invention relates to improvements in coffee urns and has for its primary object the provision of an improved construction and arrangement of this character adapted and arranged to keep a supply of coffee after made in first class condition.

Another object of the invention is to provide means for preventing boiling of the coffee after the same has been leeched and is ready for use, thereby preserving the flavor of the coffee and preventing deterioration thereof.

Other objects will appear hereinafter.

The invention consists in the combinations and arrangements of parts hereinafter described and claimed.

The invention will be best understood by reference to the accompanying drawing forming a part hereof, and which is a vertical transverse section of the coffee urn embodying the invention.

The preferred form of construction as illustrated in the drawing comprises the usual outer boiler 10 filled with water to the level 11, said water being normally kept in a boiling condition by means of the urn. Arranged within the boiler 10 is the usual stoneware jar or receptacle 12, adapted and arranged to contain the coffee after it has been leeched and prepared in the usual way and up to an indicated level 13. So much of the construction is old and well known, constituting the usual coffee urn for the purpose.

Arranged at the bottom of the coffee jar 12 is a head or fitting 14 resting against the bottom of the jar and held in place by a hollow threaded thimble or nut 15, a gasket 16 being interposed between the head 14 and the bottom of the jar 12 to prevent leakage. The head 14 is provided with a central passageway, or pipe elbow 17, and to which is screwed a suitable delivery pipe 18, as shown. The delivery pipe 18 extends horizontally through the bottom of the boiler 10, and is provided at its outer end with an enlarged head 19 resting against the inner wall of the boiler 10. The pipe 18 leads to a discharge faucet 20 on the outside of the boiler, being connected with said faucet by means of a threaded nipple 21 on said faucet and threaded in the head 19. The faucet member 20 is also provided with an enlarged flange 22 resting against the outer wall of the boiler 10 and sealing the necessary opening through the wall thereof. The elbow 17 in the fitting 14 is surrounded by a wall 23, distanced therefrom so as to form an air space as shown. The end of the wall 23 is recessed to receive the end of the casing pipe 24, as shown, the outer end of said casing pipe 24 fitting snugly over an enlarged flange 25 on the head 19, thereby forming a dead air space 26 around the discharge pipe 18. By this arrangement, it will be noted, that the dead air space is provided completely surrounding the discharge pipe 18 and the elbow 17, whereby said parts are completely insulated from the boiling water in the boiler 10. In this manner the coffee withdrawn from the jar 12 is protected from the action of the boiling water in the boiler 10, and thereby prevented from boiling in the pipe 18 and elbow 17, either during the necessary standing in said pipe or withdrawal therefrom. In this way the flavor of the coffee is maintained and the bitterness induced by boiling thereof after the same has been leeched, is avoided.

While I have illustrated and described the preferred form of construction for carrying my invention into effect, this is capable of variation and modification without departing from the spirit of the invention. I therefore do not wish to be limited to the precise details set forth, but desire to avail myself of such variations and modifications as fall within the scope of the appended claim.

Having thus described my invention, what I claim as new and desire to secure by Letters Patent is:

A coffee urn comprising an outer boiler; a coffee receptacle within said boiler and having a discharge opening at its bottom; a pipe elbow fitting resting against the bottom of said receptacle; a hollow threaded thimble nut resting against the inner bottom of said receptacle and threaded in said elbow fitting; a gasket in said connection preventing leakage; a delivery pipe connected at its inner end with pipe elbow fitting and extending thence to the exterior wall of said boiler, said pipe being provided at its outer end with a large head resting against the inner wall of said boiler; a faucet extending through the wall of said boiler and engaging said delivery pipe; and a casing surrounding said delivery pipe and supported at its inner end on said pipe elbow fitting and at its outer end on the enlarged head of said delivery pipe and forming a dead air space around said delivery pipe.

In witness whereof, I have hereunto set my hand this 12th day of July, 1928.

JOHN N. SHAW.